(12) United States Patent
Yoon et al.

(10) Patent No.: US 12,440,190 B2
(45) Date of Patent: Oct. 14, 2025

(54) APPARATUS AND METHOD FOR MEASURING VELOCITY OF ACOUSTIC SURFACE WAVE USING FULL-FIELD LASER ULTRASOUND IMAGING TECHNIQUE

(71) Applicant: GIST(Gwangju Institute of Science and Technology), Gwangju (KR)

(72) Inventors: Tae Il Yoon, Gwangju (KR); Byeong Ha Lee, Gwangju (KR); Young Gue Kim, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 304 days.

(21) Appl. No.: 18/337,590

(22) Filed: Jun. 20, 2023

(65) Prior Publication Data

US 2024/0237970 A1 Jul. 18, 2024

(30) Foreign Application Priority Data

Jan. 13, 2023 (KR) .................. 10-2023-0005557

(51) Int. Cl.
*A61B 18/20* (2006.01)
*A61B 8/00* (2006.01)

(52) U.S. Cl.
CPC .......... *A61B 8/5207* (2013.01); *A61B 8/5223* (2013.01); *A61B 18/203* (2013.01); *A61B 8/4455* (2013.01)

(58) Field of Classification Search
CPC ... A61B 8/5207; A61B 8/5223; A61B 18/203; A61B 8/4455; A61B 5/0095; A61B 8/10; A61B 3/165; A61B 3/0016
See application file for complete search history.

(56) References Cited

U.S. PATENT DOCUMENTS

| | | | |
|---|---|---|---|
| 10,368,843 B2 * | 8/2019 | Peterson | G01S 7/52071 |
| 2015/0101411 A1 * | 4/2015 | Zalev | A61B 5/0095 73/643 |
| 2015/0265155 A1 * | 9/2015 | Zalev | A61B 5/0095 600/407 |
| 2016/0038119 A1 * | 2/2016 | Desjardins | A61B 8/4444 600/424 |
| 2016/0374562 A1 * | 12/2016 | Vertikov | A61B 5/0095 600/424 |
| 2017/0322071 A1 * | 11/2017 | Schmid | A61B 5/7203 |
| 2019/0307334 A1 * | 10/2019 | Wang | G01N 29/2418 |
| 2022/0350082 A1 * | 11/2022 | Yang | A61B 5/0095 |

\* cited by examiner

*Primary Examiner* — David J Bolduc
(74) *Attorney, Agent, or Firm* — Studebaker Brackett PLLC

(57) ABSTRACT

The present disclosure relates to an apparatus and method for measuring the velocity of a surface wave using a laser ultrasound imaging technique. A method of measuring the velocity of a surface wave according to an embodiment of the present disclosure includes: emitting a laser pulse to a target material; obtaining wavefront image of a surface wave, which propagates on a surface of the target material due to the laser pulse, by emitting a probe beam to the target material; and determining a velocity of the surface wave based on variation of the wavefront image according to a time delay between the laser pulse and the probe beam.

19 Claims, 8 Drawing Sheets

APPARATUS AND METHOD FOR MEASURING VELOCITY OF ACOUSTIC SURFACE WAVE USING FULL-FIELD LASER ULTRASOUND IMAGING TECHNIQUE

CROSS REFERENCE TO RELATED APPLICATION

The present application claims priority to Korean Patent Application No. 10-2023-0005557, filed Jan. 13, 2023, the entire contents of which is incorporated herein for all purposes by this reference.

BACKGROUND OF THE INVENTION

Field of the Invention

The present disclosure relates to an apparatus and method for measuring the velocity of a surface wave using a laser ultrasound imaging technique.

Description of the Related Art

Currently, only a contact type measurement method that uses an eye drop anesthetic is generally used in intraocular pressure measurement for diagnosing glaucoma. According to the contact type measurement method, when the elasticity of an eyeball changes due to a contact, re-measurement is impossible for a certain time and contagion or corneal erosion may be caused, so there is an industrial need for a non-contact type tonometer.

In relation to this matter, non-contact type tonometers that are generally used though is a type of using an air puff, but this type has a problem of giving patients an unpleasant feeling and causing tense in the process of measuring an intraocular pressure.

Accordingly, a method that is implemented in a non-contact type and can accurately measure an intraocular pressure without giving patients an unpleasant feeling is required.

SUMMARY OF THE INVENTION

An objective of the present disclosure is to measure the velocity of a surface wave by obtaining an image of a surface wave, which is generated on the surface of a target material, in the full field.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

In order to achieve the objectives described above, a method of measuring the velocity of a surface wave according to an embodiment of the present disclosure includes: emitting a laser pulse to a target material; obtaining wavefront image of a surface wave, which propagates on a surface of the target material due to the laser pulse, by emitting a probe beam to the target material; and determining a velocity of the surface wave based on variation of the wavefront image according to a time delay between the laser pulse and the probe beam.

In an embodiment, the target material includes an absorber that is thinner than a wavelength of the surface wave.

In an embodiment, the obtaining of a wavefront image includes obtaining a 2D wavefront image for the surface of the target material using the probe beam reflecting from the surface of the target material.

In an embodiment, the obtaining of a wavefront image includes obtaining a wavefront image composed of z-axial displacement values of the surface wave about x and y axes.

In an embodiment, the method further includes obtaining a reference image by emitting a probe beam to the target material before emitting the laser pulse, and the obtaining of a wavefront image includes obtaining the wavefront image by subtracting the reference image from an image obtained by emitting a probe beam to the target material after emitting the laser pulse.

In an embodiment, the determining of a velocity of the surface wave includes: removing high-frequency noise of the wavefront image; and determining the velocity of the surface wave based on variation of the wavefront image with noise removed.

In an embodiment, the removing of high-frequency noise includes removing the high-frequency noise by applying a Low Pass Filter (LPF) to the wavefront image.

In an embodiment, the removing of high-frequency noise includes removing the high-frequency noise by applying Fourier-Bessel transform to the wavefront image.

In an embodiment, the determining of a velocity of the surface wave includes recognizing position variation of the surface wave from a plurality of wavefront images obtained for respective time delays, and determining the velocity of the surface wave based on the position variation and the time delays.

In an embodiment, the determining of a velocity of the surface wave includes: creating a line profile in a propagation direction of the ultrasound wave from the wavefront image; and determining the velocity of the surface wave based on variation of the line profile for each time delay.

In an embodiment, the determining of a velocity of the surface wave includes recognizing position variation of an n-th ridge or groove of the line profile for each time delay, and determining the velocity of the surface wave based on the position variation and the time delays.

Further, in order to achieve the objectives described above, an apparatus for measuring the velocity of a surface wave according to an embodiment of the present disclosure includes: a first light source configured to emit a laser pulse to a target material; a second light source configured to emit a probe beam to the target material after emitting the laser pulse; an image sensor configured to create a wavefront image of a surface wave generated by the laser pulse using a probe beam reflecting from the target material; and a processor configured to determine a velocity of the surface wave based on variation of the wavefront image according to a time delay between the laser pulse and the probe beam.

In an embodiment, the second light source emits a probe beam to the target material before the laser pulse is emitted, the image sensor creates a reference image using a probe beam reflecting from the target material before the laser pulse is emitted, and the processor determines a velocity of the surface wave based on variation of the wavefront image obtained by subtracting the reference image from an image created by a probe beam emitted after the laser pulse is emitted.

In an embodiment, the processor removes high-frequency noise of the wavefront image and determines the velocity of the surface material based on variation of the wavefront image with the noise removed.

In an embodiment, the processor removes the high-frequency noise by applying a Low Pass Filter (LPF) to the wavefront image.

In an embodiment, the processor removes the high-frequency noise by applying Fourier-Bessel transform to the wavefront image.

In an embodiment, the processor recognizes position variation of the surface wave from a plurality of wavefront images obtained for respective time delays, and determines the velocity of the surface wave based on the position variation and the time delays.

In an embodiment, the processor creates a line profile in a propagation direction of the ultrasound wave from the wavefront image and determines the velocity of the surface wave based on variation of the line profile for each time delay.

In an embodiment, the processor recognizes position variation of an n-th ridge or groove of the line profile for each time delay, and determines the velocity of the surface wave based on the position variation and the time delays.

The present disclosure has an advantage that it is possible to briefly and accurately figure out the properties of an elastic body in a non-contact type by obtaining an image of a surface wave, which is generated on the surface of a target material, in the full field and measuring the velocity of the surface wave using the image.

Further, the present disclosure has an advantage that it is possible to figure out eyeball information without giving a patient an unpleasant feeling when it is applied to an eyeball by obtaining an image of a surface wave, which is generated on the surface of a target material, in the full field and measuring the velocity of the surface wave using the image.

Detailed effects of the present disclosure in addition to the above effects will be described with the following detailed description for accomplishing the present disclosure.

DETAILED DESCRIPTION OF THE INVENTION

Figure 1:
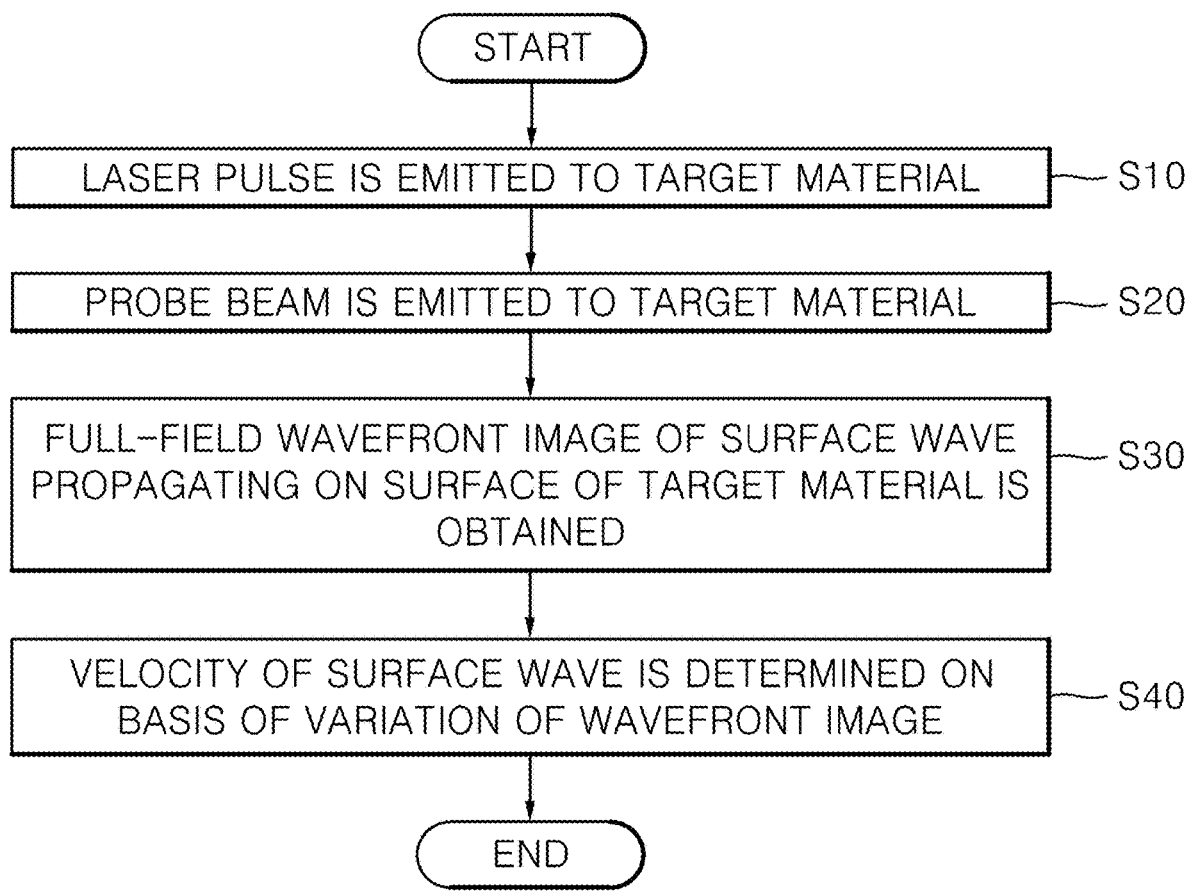
FIG. 1 is a flowchart showing a method of measuring the velocity of a surface wave using a full-field laser ultrasound imaging technique.

The objectives, characteristics, and advantages will be described in detail below with reference to the accompanying drawings, so those skilled in the art may easily achieve the spirit of the present disclosure. However, in describing the present disclosure, detailed descriptions of well-known technologies will be omitted so as not to obscure the description of the present disclosure with unnecessary details. Hereinafter, exemplary embodiments of the present invention will be described with reference to accompanying drawings. The same reference numerals are used to indicate the same or similar components in the drawings.

Although terms "first", "second", etc. are used to describe various components in the specification, it should be noted that these components are not limited by the terms. These terms are used to discriminate one component from another component and it is apparent that a first component may be a second component unless specifically stated otherwise.

Further, when a certain configuration is disposed "over (or under)" or "on (beneath)" of a component in the specification, it may mean not only that the certain configuration is disposed on the top (or bottom) of the component, but that another configuration may be interposed between the component and the certain configuration disposed on (or beneath) the component.

Further, when a certain component is "connected", "coupled", or "jointed" to another component in the specification, it should be understood that the components may be directly connected or jointed to each other, but another component may be "interposed" between the components or the components may be "connected", "coupled", or "jointed" through another component.

Further, singular forms that are used in this specification are intended to include plural forms unless the context clearly indicates otherwise. In the specification, terms "configured", "include", or the like should not be construed as necessarily including several components or several steps described herein, in which some of the components or steps may not be included or additional components or steps may be further included.

Further, the term "A and/or B" stated in the specification means that A, B, or A and B unless specifically stated otherwise, and the term "C to D" means that C or more and D or less unless specifically stated otherwise.

The present disclosure relates to a method of measuring the velocity of a surface wave by obtaining an image of a surface wave, which is generated on the surface of a target material, in the full field. Hereafter, an apparatus and method for measuring the velocity of a surface wave using a full-field laser ultrasound imaging technique (hereafter, an apparatus and method of measuring the velocity of a surface wave) according to an embodiment of the present disclosure is described in detail with reference to FIGS. 1 to 8.

FIG. 1 is a flowchart showing a method of measuring the velocity of a surface wave using a full-field laser ultrasound imaging technique.

Figure 2:
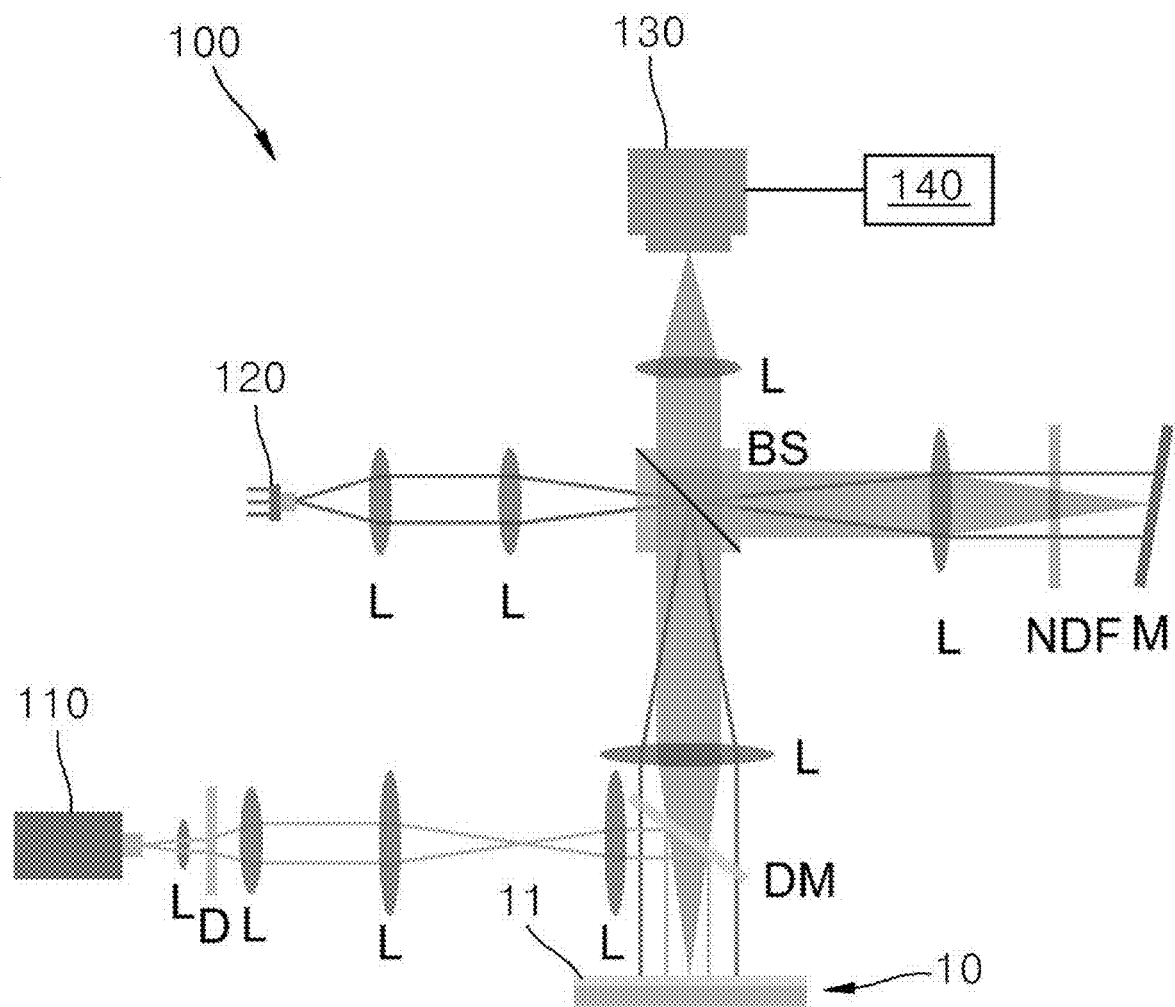
FIG. 2 is a view showing an apparatus for measuring the velocity of a surface wave according to an embodiment of the present disclosure.

FIG. 2 is a view showing an apparatus for measuring the velocity of a surface wave according to an embodiment of the present disclosure.

Figure 3:
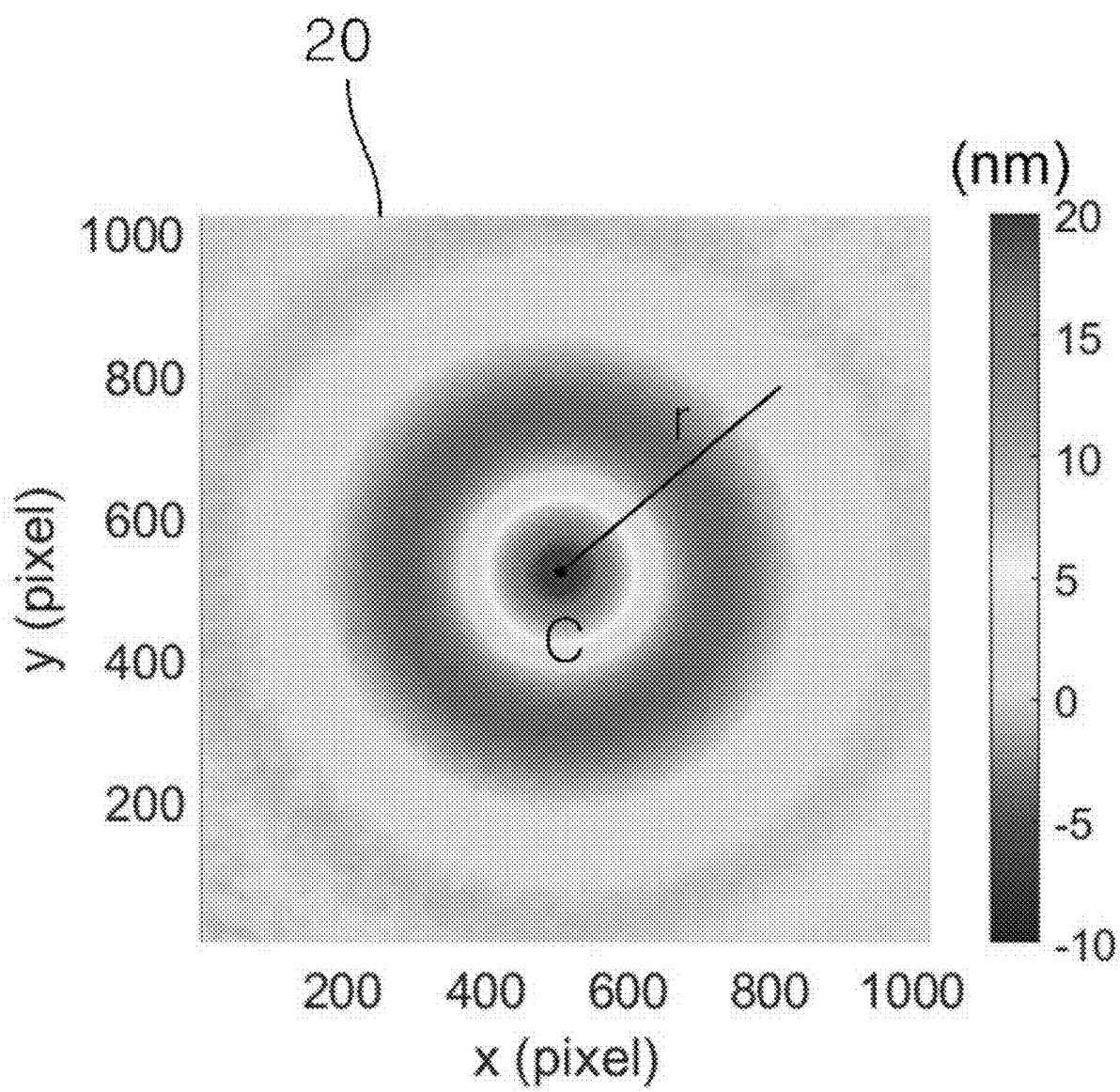
FIG. 3 is a view showing a wavefront image of a surface wave propagating on the surface of a target material.
Figure 4:
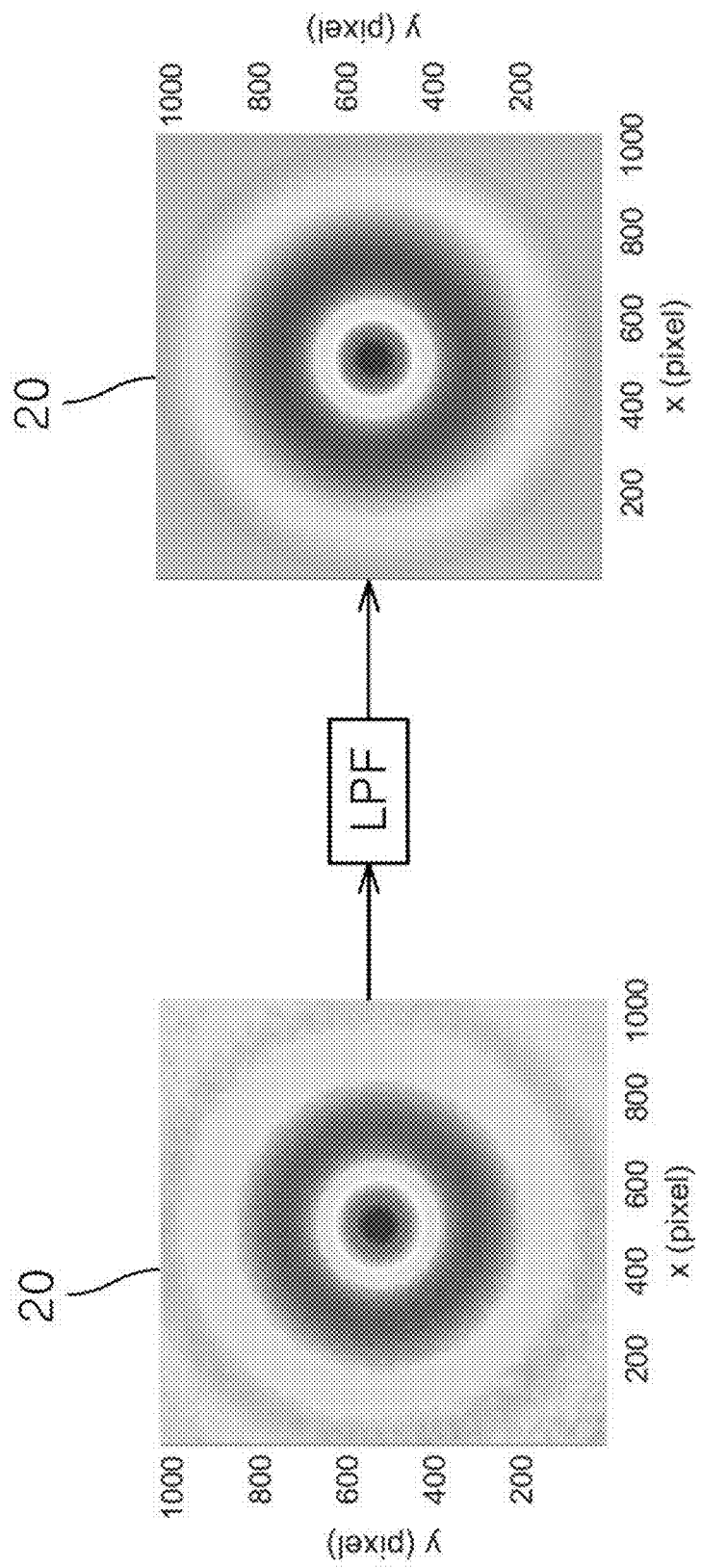
FIG. 4 is a view illustrating a process of removing high-frequency noise in a wavefront image.

FIG. 3 is a view showing a wavefront image of a surface wave propagating on the surface of a target material and FIG. 4 is a view illustrating a process of removing high-frequency noise in a wavefront image.

Figure 5:
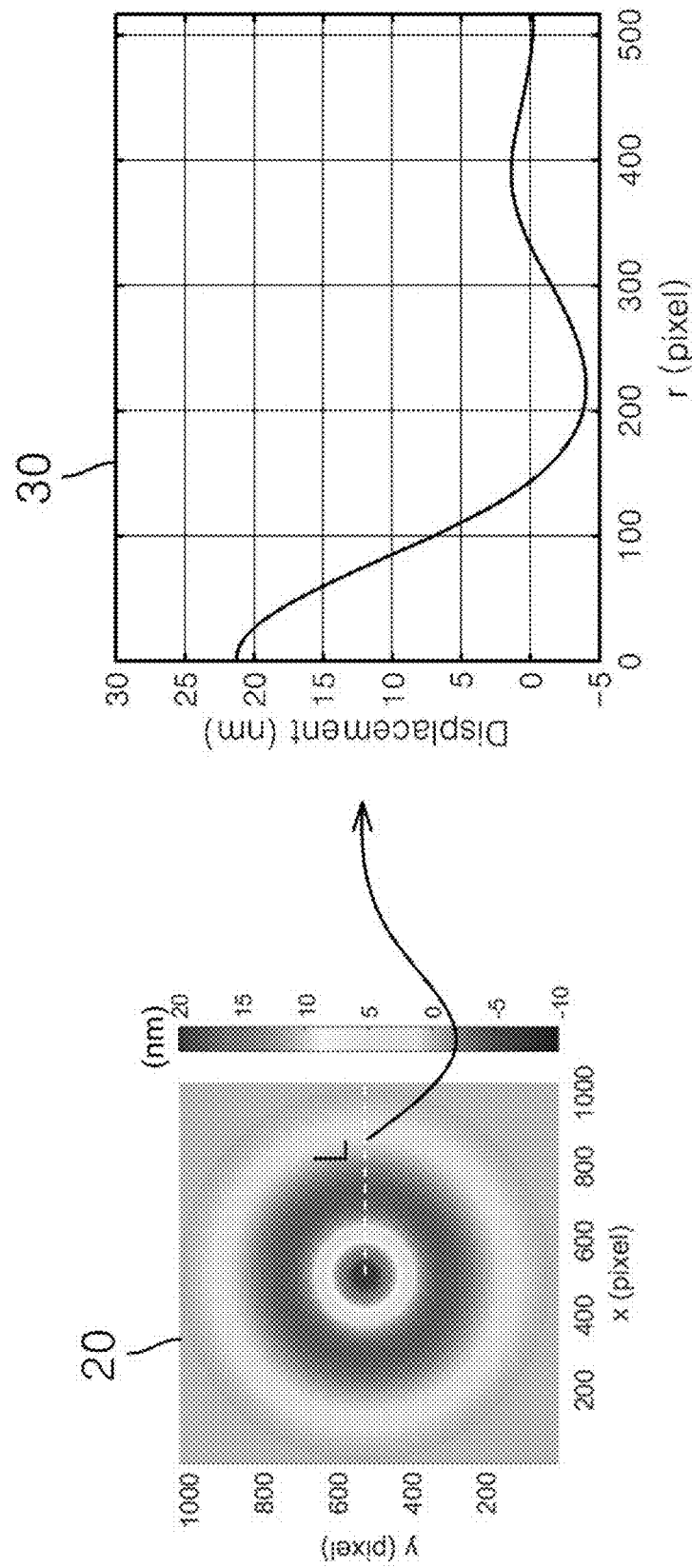
FIG. 5 is a view showing a line profile obtained from a wavefront image.
Figure 6:
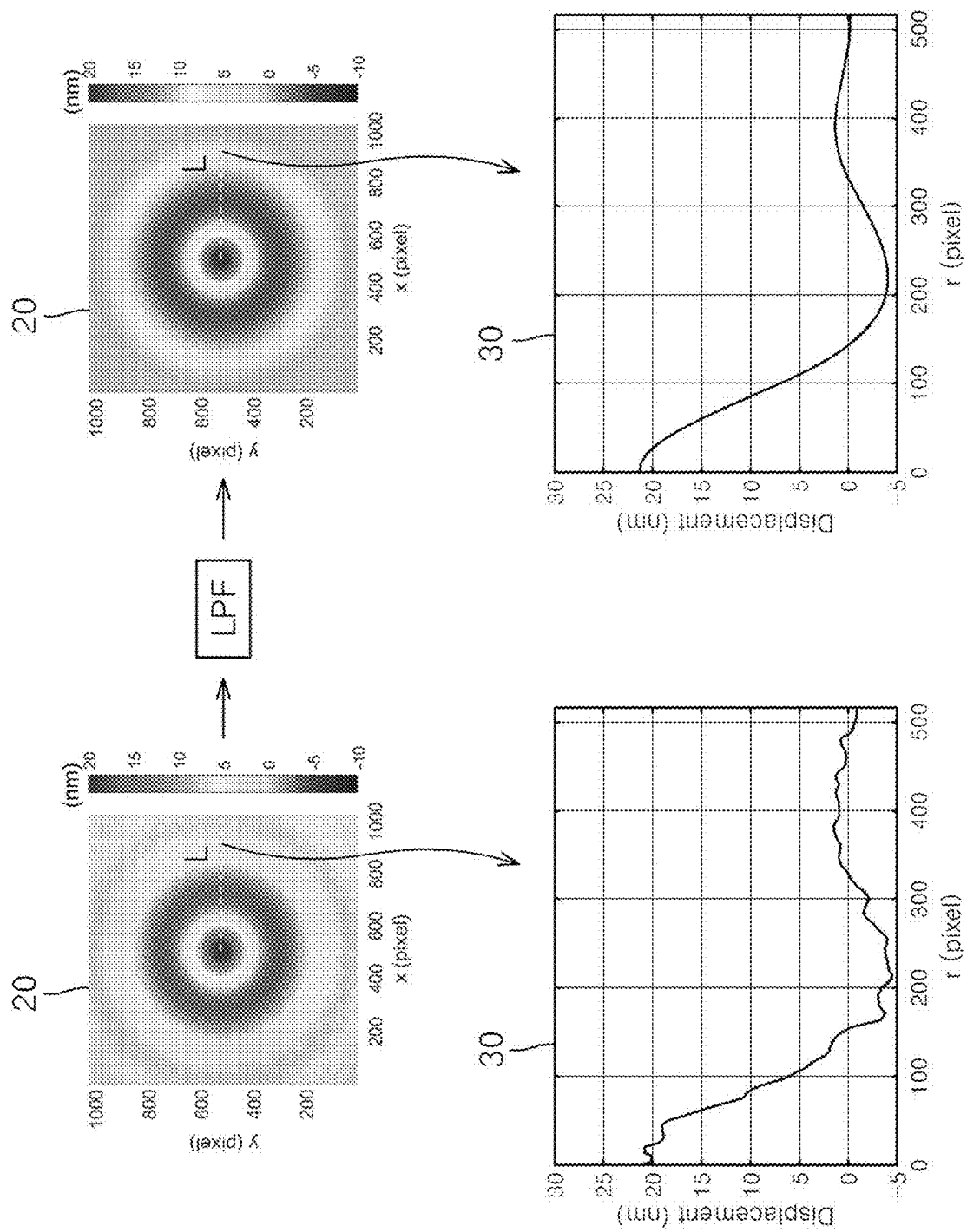
FIG. 6 is a view comparing a line profile before and after removing high-frequency noise.

FIG. 5 is a view showing a line profile obtained from a wavefront image and FIG. 6 is a view comparing a line profile before and after removing high-frequency noise.

Figure 7:
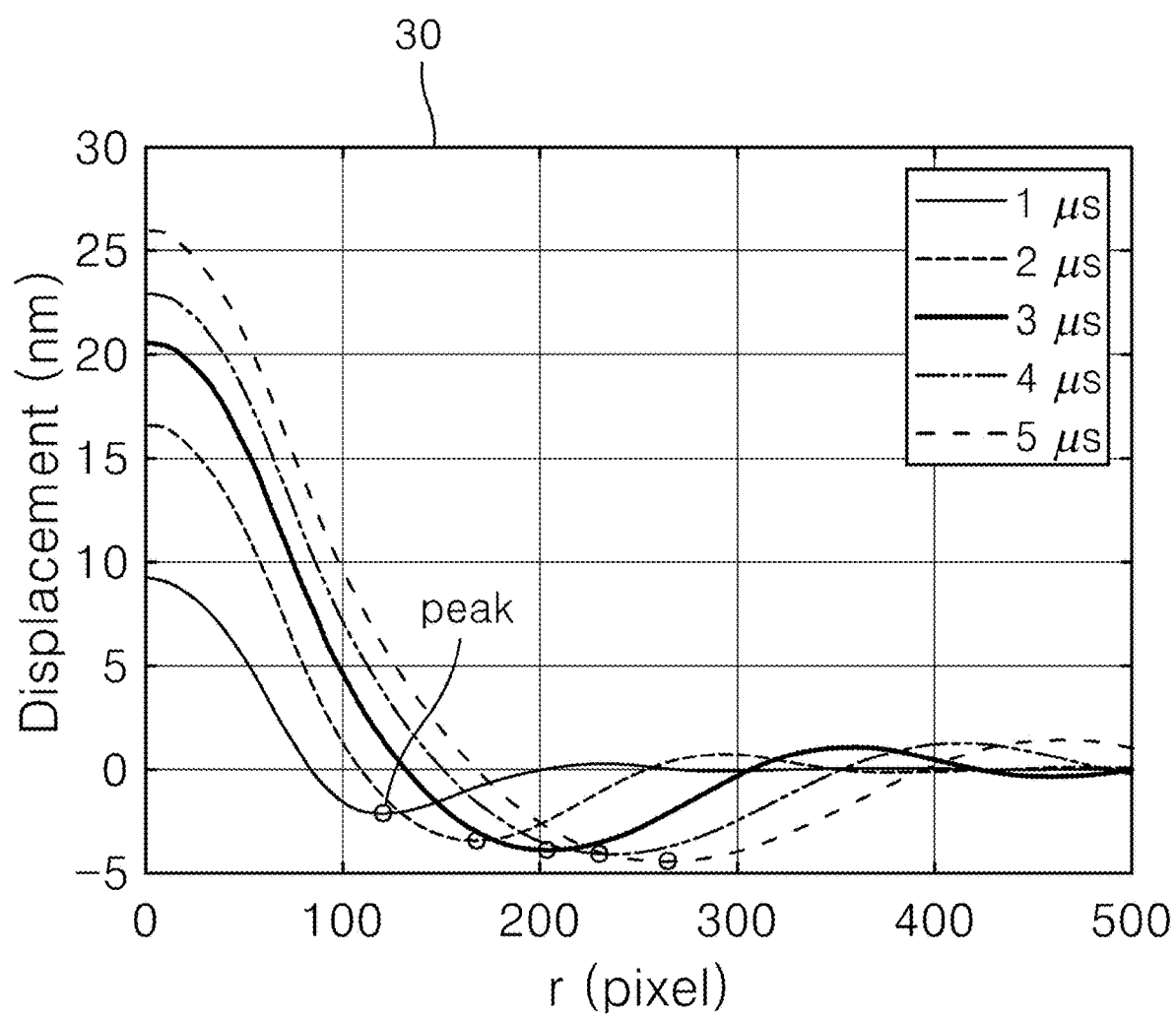
FIG. 7 is a view comparing variation of a line profile according to the time delay between a laser pulse and a probe beam.
Figure 8:
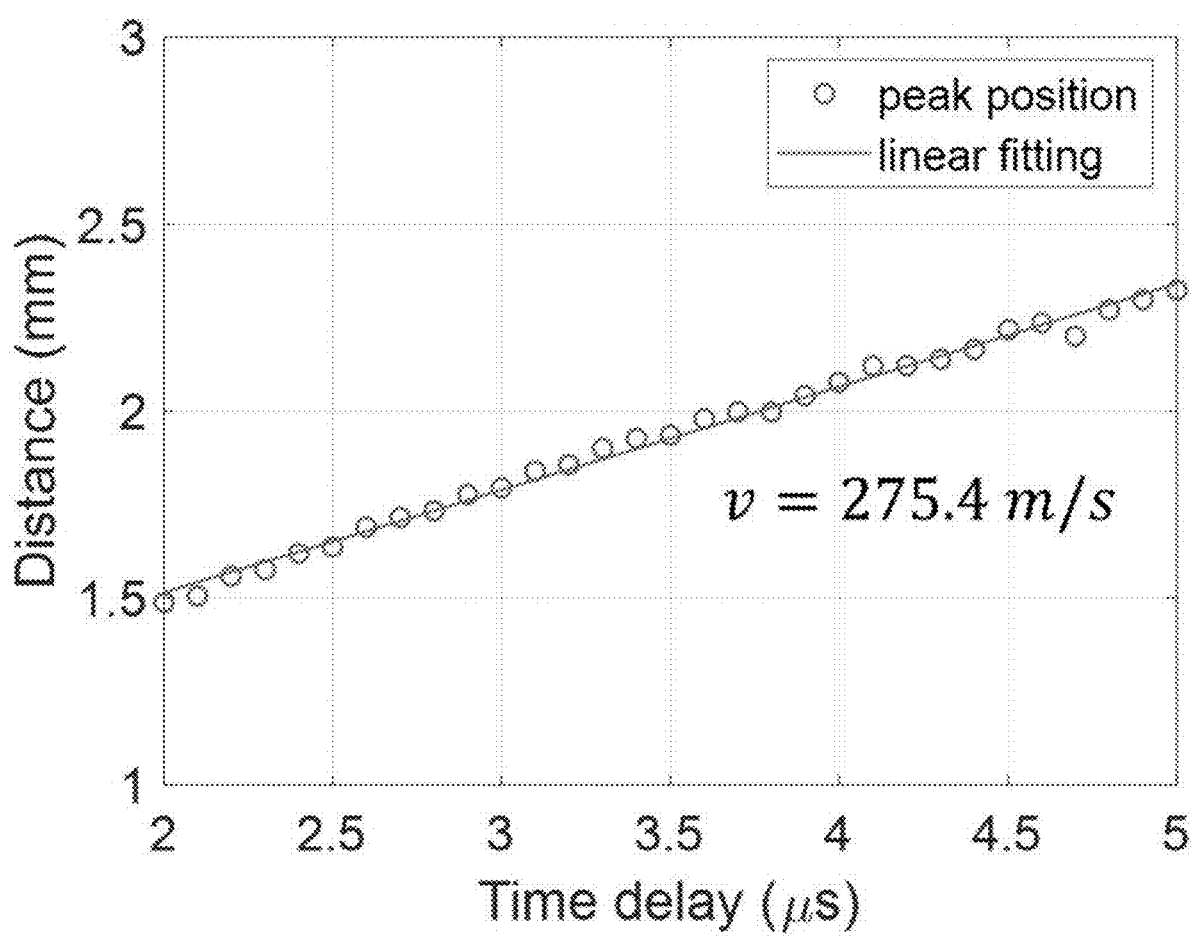
FIG. 8 is a view showing a process of determining the velocity of a surface wave in accordance with variation of a line profile.

FIG. 7 is a view comparing variation of a line profile according to the time delay between a laser pulse and a probe beam and FIG. 8 is a view showing a process of determining the velocity of a surface wave in accordance with variation of a line profile.

The present disclosure, fundamentally, can use a laser ultrasound imaging technique that analyzes the properties of a certain substance using an ultrasound wave that is generated by the substance when a laser pulse is emitted to the substance.

In detail, a laser ultrasound imaging technique is a technique that emits a laser to a sample such that the laser is absorbed on the surface of the sample, and makes an image from a signal that returns to the surface when an ultrasound generated on the surface of the sample and propagating into the sample reflects from a target material.

An objective of the present disclosure is to measure the velocity of an ultrasound wave propagating on the surface of a substance, that is, a surface wave through the laser ultrasound imaging technique described above, and operation of the present disclosure is described in detail hereafter.

Referring to FIG. 1, a method of measuring the velocity of a surface wave according to an embodiment of the present disclosure may include emitting a laser pulse to a target material (S10), emitting a probe beam to the target material (S20), obtaining a full-field wavefront image of a surface wave propagating on the surface of the target material (S30), and determining the velocity of the surface wave based on variation of the wavefront image.

However, the method of measuring the velocity of a surface wave shown in FIG. 1 is based on an embodiment, the steps of the present disclosure are not limited to the embodiment shown in FIG. 1, and if necessary, some steps may be added, changed, or removed.

The method of measuring the velocity of a surface wave shown in FIG. 1 may be performed by a processor and the processor may be a component of an apparatus for measuring the velocity of a surface wave.

Referring to FIG. 1, an apparatus 100 for measuring the velocity of a surface wave may include a first light source 110, a second light source 120, an image sensor 130, and a processor 140. In additional the apparatus may further include at least one mirror M for controlling the path of light, diffusing light, or adjusting the quantity of light, a lens L, a beam splitter BS, a dichroic mirror DM, a diffuser D, a neutral density filter NDF, etc.

However, the apparatus 100 for measuring the velocity of a surface wave shown in FIG. 2 is based on an embodiment, the components thereof are not limited to the embodiment shown in FIG. 2, and if necessary, some components may be added, changed, or removed.

Hereafter, the steps shown in FIG. 1 are described with reference to the components shown in FIG. 2.

The processor 140 can emit a laser pulse to a target material 10 (S10).

In detail, the processor 140 can control the first light source 110 to emit a laser pulse to the target material 10. The laser pulse may have a short pulse width to generate a photoacoustic effect and the wavelength of the laser pulse can be appropriately adjusted to enable an eyeball to be applied as the target material 10.

As shown in FIG. 2, the laser pulse output from the first light source 110 can travel to the target material 10 through the diffuser D, a plurality of lenses L, and the dichroic mirror DM, and an ultrasound wave can be generated on the surface of the target material 10.

After a laser pulse is emitted in accordance with step S10, the processor 140 can emit a probe beam to the target material 10 (S20).

In detail, the processor 140 can control the second light source 120 to emit a probe beam to the target material 10.

The probe beam is a sensing target of the image sensor and can enable the image sensor 130 to create a wavefront image 20 to be described below.

As shown in FIG. 2, the probe beam output from the second light source 120 can be split by the beam splitter BS to travel to the mirror M and the target material 10, respectively, and in this case, at least one lens L and an ND filter may be provided on each optical path.

Meanwhile, in order to form an elastic wave on the surface of the target material 10, the target material 10 may include, on the surface thereof, an absorber 11 that is thinner than the wavelength of an ultrasound wave that is generated by a laser pulse.

The processor 140 can obtain a full-field wavefront image 20 of a surface wave propagating on the surface of the target material 10 by a laser pulse using a probe beam (S30).

The image sensor 130 can create a wavefront image 20 of a surface wave generated by a laser pulse using a probe beam reflecting from the target material 10 and can provide the created wavefront image 20 to the processor 140.

The probe beam reflecting from the mirror M and the probe beam reflecting from the target material 10 are combined, whereby an interference signal can be formed. The image sensor 130 can create a wavefront image 20 of the surface wave by sensing the interference signal. In detail, when the first light source 110 emits a laser pulse to the target material 10 at the point in time $t_0$ and then the second light source 120 emits a probe beam to the target material 10 at the point in time $t_s$, the image sensor 130 can create a wavefront image 20 at the point in time $t_s$, that is, a wavefront image 20 of a surface wave generated at the point in time to and propagating until the point in time $t_s$.

Referring to FIG. 3, a wavefront image 20, which is a full-field 2D image of the surface of the target material 10, may be an image on an x-y plane. In detail, the wavefront image 20 may be composed of z-axial displacement values of a surface wave about x and y axes. Meanwhile, since an ultrasound wave diffuses in a spherical wave type on or in the target material 10, a wavefront image 20 may be shown in a circular shape.

Meanwhile, when only information about the surface wave is included in a wavefront image 20, the accuracy of the operation of determining the velocity of the surface wave to be described above can be improved. Noise such as the noise of the target material 10 itself including bending, and roughness of the surface of the target material 10, and foreign materials may be included in a wavefront image 20.

In order to remove the noise, the processor 140 can obtain a reference image by emitting a probe beam to the target material 10 before a laser pulse is emitted, and can obtain a wavefront image 20 by subtracting the reference image from the image obtained by emitting the probe beam after the laser pulse is emitted.

In detail, before a laser pulse is emitted in accordance with step S10, the second light source 120 can emit a probe beam to the target material 10 by control of the processor 140. The image sensor 130 can create a reference image using the probe beam reflecting from the target material 10 before step S10 and can provide the reference image to the processor 140. Accordingly, the reference image can include information about the target material 10 itself including the noise on the surface of the target material 10.

Next, after a laser pulse is emitted in accordance with step S10, the second light source 120 can emit a probe beam to the target material 10 by control of the processor 140. The image sensor 130 can create an image using a probe beam after step S10 and can provide the image to the processor 140. The processor 140 can obtain a wavefront image 20 by subtracting the previously provided reference image from the image provided after step S10. Accordingly, only information about the surface wave with the information about the target material 10 itself removed can be include in the wavefront image 20.

The processor 140 can obtain a wavefront image 20 in accordance with the method described above and can determine the velocity of the surface wave based on variation of the wavefront image 20 according to a time delay between the laser pulse and the probe beam (S40).

Meanwhile, the processor 140 can remove high-frequency noise from the wavefront image 20 before the operation of determining the velocity of the surface wave. For example, even though the wavefront image 20 includes only the information about the surface wave itself, as described above, noise may be included in the wavefront image 20, depending on a high frequency component of the surface wave itself or an error in operation of the image sensor 130. In consideration of this fact, the processor 140 can remove high-frequency noise from the wavefront image 20.

Referring to FIG. 4, in an example, the processor 140 can remove high-frequency noise in the wavefront image 20 by applying a Low Pass Filter (LPF) to the wavefront image 20. As described above, the wavefront image 20 may include noise and the noise may have a high frequency in comparison to the frequency of common surface waves. Accordingly, the processor 140 can pass the wavefront image 20 through the Low Pass Filter (LPF) and high-frequency components in the wavefront image 20 are removed, whereby noise can be removed.

As another example, the processor can remove the high-frequency noise by applying Fourier-Bessel transform (the same as Hankel transform) to the wavefront image 20. As described with reference to FIG. 3, the wavefront image 20 may be shown in a circular shape. In more detail, the wavefront image 20 may have a circular symmetry.

Fourier-Bessel transform is Fourier transform for a cylindrical coordinate system defined by p, φ, and z axes, and the processor 140 can apply Fourier-Bessel transform to the wavefront image 20 in consideration of the fact that the wavefront image 20 has circular symmetry.

In detail, as shown in FIG. 3, the wavefront image 20 may be expressed as a surface wavefront function ($g_r(r)$) defined in accordance with a center C and a radius r. In this case, the processor 140 can apply Fourier-Bessel transform to the wavefront image 20 in accordance with the following Equation 1.

$$G_0(\rho) = 2\pi \int_0^\infty rg_r(r)J_0(2\pi r\rho)dr \quad \text{[Equation 1]}$$

(where r is a radius, $g_r(r)$ is a surface wave function, and $J_o$ is a $0^{th}$ Bessel function).

Accordingly, a surface wave function that is expressed in a space can be divided into frequency components and the processor 140 can remove high-frequency noise from the wavefront image 20 by removing high-frequency components from the divided frequency components.

The processor 140 can determine the velocity of the surface wave based on variation of the wavefront image 20 after selectively performing the operation of removing noise described above. As described above, the points in time of a laser pulse and a probe beam may be different. In this case, the processor 140 can adjust the time delay between the laser pulse and the probe beam and can obtain a wavefront image 20 according to each time delay.

Since a surface wave is caused by a laser pulse and propagates along the surface of the target material 10 over time, a wavefront image 20 according to a time interval may change. The processor can determine the velocity of a surface wave based on such variation.

In detail, the processor 140 can recognize position variation of a surface wave from a plurality of wavefront images 20 obtained in accordance with time delays and can determine the velocity of the surface wave based on the position variation and the time delays.

In other words, the processor 140 can recognize a position change of a surface wave in wavefront images 20 obtained in accordance with respective time delays, and can determine the position change, that is, a velocity according to time based on the position change. Various methods may be used to recognize the position of a surface wave, and for example, a line profile 30 may be used.

Referring to FIG. 5, the processor 140 can create a line profile 30 according to the propagation direction of an ultrasound wave from the wavefront image 20. In detail, the processor 140 can create a virtual line L in the propagation direction of an ultrasound wave from the center of the wavefront image 20, that is, in the direction of a radius r. As described above, since the wavefront image 20 is composed of z-axial displacement values, the processor 140 can create a line profile 30 by recognizing the value of the wavefront image 20 for the line.

The line profile 30 may be created for each time delay between a laser pulse and a probe beam and the processor 140 can determine the velocity of a surface wave based on variation of a line profile for each time delay.

As shown in FIG. 5, the line profile may have a sine wave form that reduces in the radial direction and all of line profiles created for respective time delays may show a type of surface wave that is a velocity measurement target.

The processor 140 can recognize the position of a surface wave using the formal characteristic of a sinusoidal wave, and to this end, the operation of removing high-frequency wave should be performed first.

Referring to FIG. 6, a line profile 30 created from the wavefront image 20 before removing the high-frequency noise may be shown in a sine wave form including noise. However, a line profile 30 created from the wavefront image 20 with high-frequency noise removed may be shown in a clean sine wave form and the processor 140 can use the formal characteristics of the sinusoidal wave.

In detail, the processor 140 can recognize position variation of an n-th ridge or groove (n is a natural number) of a line profile 30 for each time delay and can determine the velocity of a surface wave based on the position variation and the time delays.

Referring to FIG. 7, as an example, the processor 140 can create a line profile 30 for each of time delays (1 µs, 2 µs, 3 µs, 4 µs, and 5 µs) between a laser pulse and a probe beam. In order to specify the part of the surface wave to be compared, the processor 140 may identify the position (peaks) of the n-th ridge or groove of each sinusoidal wave, or the position of the first ridge in the example of the drawing.

The processor 140 can determine the velocity of the surface wave based on how much the position of a previously recognized ridge changes over time.

Referring to FIG. 8, as an example, the processor 140 can recognize how far the position (peak) recognized for each time delay is from the center C of a surface wave, that is, the distance from the center C, and can create a line connecting the distances for the time delays through linear fitting.

Since the slope of a straight line shows a value obtained dividing a distance by time, a velocity, the processor 140 can determine the velocity of the surface wave as 275.4 m/s.

As described above, the present disclosure has an advantage that it is possible to briefly and accurately figure out the properties of an elastic body in a non-contact type by obtaining an image of a surface wave, which is generated on the surface of a target material 10, in the full field manner and measuring the velocity of the surface wave using the image.

Further, the present disclosure has an advantage that it is possible to figure out eyeball information without giving a patient an unpleasant feeling when it is applied to an eyeball by obtaining an image of a surface wave, which is generated on the surface of a target material 10, in the full field manner and measuring the velocity of the surface wave using the image.

Although the present disclosure was described with reference to the exemplary drawings, it is apparent that the present disclosure is not limited to the embodiments and drawings in the specification and may be modified in various ways by those skilled in the art within the range of the spirit of the present disclosure. Further, even though the operation effects according to the configuration of the present disclosure were not clearly described with the above description of embodiments of the present disclosure, it is apparent that effects that can be expected from the configuration should be also admitted.

What is claimed is:

1. A method of measuring the velocity of a surface wave, the method comprising:
   emitting a laser pulse to a target material;
   obtaining wavefront image of a surface wave, which propagates on a surface of the target material due to the laser pulse, by emitting a probe beam to the target material; and
   determining a velocity of the surface wave based on variation of the wavefront image according to a time delay between the laser pulse and the probe beam.

2. The method of claim 1, wherein the target material includes an absorber that is thinner than a wavelength of the surface wave.

3. The method of claim 1, wherein the obtaining of a wavefront image includes obtaining a 2D wavefront image for the surface of the target material using the probe beam reflecting from the surface of the target material.

4. The method of claim 1, wherein the obtaining of a wavefront image includes obtaining a wavefront image composed of z-axial displacement values of the surface wave about x and y axes.

5. The method of claim 1, further comprising obtaining a reference image by emitting a probe beam to the target material before emitting the laser pulse,
   wherein the obtaining of a wavefront image includes obtaining the wavefront image by subtracting the reference image from an image obtained by emitting a probe beam to the target material after emitting the laser pulse.

6. The method of claim 1, wherein the determining of a velocity of the surface wave includes:
   removing high-frequency noise of the wavefront image; and
   determining the velocity of the surface wave based on variation of the wavefront image with noise removed.

7. The method of claim 6, wherein the removing of high-frequency noise includes removing the high-frequency noise by applying a Low Pass Filter (LPF) to the wavefront image.

8. The method of claim 6, wherein the removing of high-frequency noise includes removing the high-frequency noise by applying Fourier-Bessel transform to the wavefront image.

9. The method of claim 1, wherein the determining of a velocity of the surface wave includes recognizing position variation of the surface wave from a plurality of wavefront images obtained for respective time delays, and determining the velocity of the surface wave based on the position variation and the time delays.

10. The method of claim 1, wherein the determining of a velocity of the surface wave includes:
    creating a line profile in a propagation direction of the ultrasound wave from the wavefront image; and
    determining the velocity of the surface wave based on variation of the line profile for each time delay.

11. The method of claim 10, wherein the determining of a velocity of the surface wave includes recognizing position variation of an n-th ridge or groove of the line profile for each time delay, and determining the velocity of the surface wave based on the position variation and the time delays.

12. An apparatus for measuring the velocity of a surface wave, the apparatus comprising:
    a first light source configured to emit a laser pulse to a target material;
    a second light source configured to emit a probe beam to the target material after the laser pulse is emitted;
    an image sensor configured to create a wavefront image of a surface wave generated by the laser pulse using a probe beam reflecting from the target material; and
    a processor configured to determine a velocity of the surface wave based on variation of the wavefront image according to a time delay between the laser pulse and the probe beam.

13. The apparatus of claim 12, wherein the second light source emits a probe beam to the target material before the laser pulse is emitted,
    the image sensor creates a reference image using a probe beam reflecting from the target material before the laser pulse is emitted, and
    the processor determines a velocity of the surface wave based on variation of the wavefront image obtained by subtracting the reference image from an image created by a probe beam emitted after the laser pulse is emitted.

14. The apparatus of claim 12, wherein the processor removes high-frequency noise of the wavefront image and determines the velocity of the surface material based on variation of the wavefront image with the noise removed.

15. The apparatus of claim 14, wherein the processor removes the high-frequency noise by applying a Low Pass Filter (LPF) to the wavefront image.

16. The apparatus of claim 14, wherein the processor removes the high-frequency noise by applying Fourier-Bessel transform to the wavefront image.

17. The apparatus of claim 12, wherein the processor recognizes position variation of the surface wave from a plurality of wavefront images obtained for respective time delays, and determines the velocity of the surface wave based on the position variation and the time delays.

18. The apparatus of claim 12, wherein the processor creates a line profile in a propagation direction of the ultrasound wave from the wavefront image and determines the velocity of the surface wave based on variation of the line profile for each time delay.

19. The apparatus of claim 18, wherein the processor recognizes position variation of an n-th ridge or groove of the line profile for each time delay, and determines the velocity of the surface wave based on the position variation and the time delays.

\* \* \* \* \*